US008463460B2

(12) United States Patent
Sprock et al.

(10) Patent No.: US 8,463,460 B2
(45) **Date of Patent: *Jun. 11, 2013**

(54) WORKSITE MANAGEMENT SYSTEM IMPLEMENTING ANTICIPATORY MACHINE CONTROL

(75) Inventors: Christopher M. Sprock, Peoria, IL (US); Robert S. Anderson, Dunlap, IL (US); Mahmoud M. Tobaa, Dunlap, IL (US); Balmes Tejeda, Peoria, IL (US); Michael R. Verheyen, Peoria, IL (US); Jonny R. Greiner, Dunlap, IL (US); James W. Landes, East Peoria, IL (US); Michael D. Mitchell, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 26 days.

This patent is subject to a terminal disclaimer.

(21) Appl. No.: 13/030,662

(22) Filed: Feb. 18, 2011

(65) Prior Publication Data

US 2012/0215379 A1 Aug. 23, 2012

(51) Int. Cl.
*G07C 5/08* (2006.01)
*G05B 23/02* (2006.01)

(52) U.S. Cl.
USPC .......... 701/2; 701/50

(58) Field of Classification Search
USPC .......... 701/2, 50
See application file for complete search history.

(56) References Cited

U.S. PATENT DOCUMENTS

| | | | | |
|---|---|---|---|---|
| 5,442,553 | A * | 8/1995 | Parrillo | 455/420 |
| 5,950,147 | A * | 9/1999 | Sarangapani et al. | 702/179 |
| 5,995,895 | A * | 11/1999 | Watt et al. | 701/50 |
| 6,119,074 | A * | 9/2000 | Sarangapani | 702/185 |
| 6,127,947 | A * | 10/2000 | Uchida et al. | 340/999 |
| 6,533,552 | B2 | 3/2003 | Centers et al. | |
| 6,643,582 | B2 | 11/2003 | Adachi et al. | |
| 7,181,370 | B2 * | 2/2007 | Furem et al. | 702/188 |
| 7,245,999 | B2 | 7/2007 | Dietsch et al. | |
| 7,406,399 | B2 | 7/2008 | Furem et al. | |
| 2002/0059320 | A1 | 5/2002 | Tamaru | |
| 2005/0071064 | A1 | 3/2005 | Nakamura et al. | |
| 2007/0124000 | A1 | 5/2007 | Moughler et al. | |
| 2007/0124050 | A1 | 5/2007 | Donnelli et al. | |

(Continued)

FOREIGN PATENT DOCUMENTS

KR 1020060117585 * 11/2006

OTHER PUBLICATIONS

Research Disclosure 423068, "Autonomous excavating and loading system", (disclosed anonymously), Jul. 1999, 8 pages.*

(Continued)

*Primary Examiner* — James Trammell
*Assistant Examiner* — David Testardi
(74) *Attorney, Agent, or Firm* — Finnegan, Henderson, Farabow, Garrett & Dunner, LLP

(57) ABSTRACT

A worksite management system for use with a mobile machine is disclosed. The worksite management system may have a control module located onboard the mobile machine and configured to control operations of the mobile machine, and a controller in communication with the control module. The controller may be configured to anticipate a non-failure machine performance irregularity, and determine an adjustment to an operation of the mobile machine that positively affects the machine performance irregularity. The controller may also be configured to cause implementation of the adjustment before the machine performance irregularity occurs.

16 Claims, 4 Drawing Sheets

U.S. PATENT DOCUMENTS

| | | | | |
|---|---|---|---|---|
| 2008/0059080 | A1* | 3/2008 | Greiner et al. | 702/33 |
| 2008/0059411 | A1* | 3/2008 | Greiner et al. | 707/2 |
| 2008/0121684 | A1* | 5/2008 | Gualandri | 235/375 |
| 2008/0208393 | A1* | 8/2008 | Schricker | 701/1 |
| 2009/0182460 | A1* | 7/2009 | O'Neal et al. | 701/2 |
| 2009/0198422 | A1 | 8/2009 | Vik et al. | |
| 2010/0042287 | A1* | 2/2010 | Zhang et al. | 701/33 |
| 2010/0179720 | A1* | 7/2010 | Lin et al. | 701/33 |
| 2010/0198466 | A1* | 8/2010 | Eklund et al. | 701/50 |

OTHER PUBLICATIONS

Translation of KR 1020060117585 (publication date of Korean document, Nov. 17, 2006).*

U.S. Patent Application of Christopher M. Sprock et al. entitled "Worksite Management System Implementing Remote Machine Reconfiguration" filed on Feb. 18, 2011.

* cited by examiner

WORKSITE MANAGEMENT SYSTEM IMPLEMENTING ANTICIPATORY MACHINE CONTROL

TECHNICAL FIELD

The present disclosure is directed to a worksite management system and, more particularly, to a worksite management system implementing anticipatory machine control.

BACKGROUND

Mining, construction, and other large scale excavating operations require fleets of digging, loading, and hauling machines to remove and transport excavated material such as ore and overburden from an area of excavation to a processing location. For such an operation to be profitable, the fleet of machines must be productively and efficiently operated. Many factors can influence productivity and efficiency at a worksite including, among other things, site conditions (e.g., rain, snow, ground moisture levels, material composition, visibility, terrain contour, road conditions, etc.) and machine conditions (e.g., age, state of disrepair, malfunction, fuel grade in use, payload, tire pressure, transmission shift points, fuel limits, steering limits, etc.). When a machine is manufactured, it is conservatively configured for operation under a particular set of theoretical conditions and cannot be reconfigured easily after being commissioned to match actual conditions found at different worksites.

One attempt to improve worksite productivity and efficiency is disclosed in U.S. Patent Publication No. 2009/0198422 (the '422 publication) by Vik et al. published on Aug. 6, 2009. In the '422 publication, Vik et al. discloses a worksite management system having a plurality of machines, a plurality of data acquisition modules configured to monitor performance of each of the machines, and a controller in communication with the data acquisition modules. The controller is configured to collect machine performance data from the data acquisition modules, and detect a performance irregularity based on the collected machine performance data. The controller is further configured to analyze the collected machine performance data, and determine which of a machine condition, an operator condition, and a site condition is the predominant cause of the performance irregularity based on the comparison.

Although the system of the '422 publication may help to identify a cause of a performance irregularity, it may do little to correct the performance irregularity or reduce the likelihood of future performance irregularities. Accordingly, the system of the '422 publication, alone, may be insufficient to improve worksite productivity and efficiency.

The present disclosure is directed to overcoming one or more of the problems set forth above and/or other problems of the prior art.

SUMMARY

In accordance with one aspect, the present disclosure is directed toward a worksite management system for use with a mobile machine. The worksite management system may include a control module located onboard the mobile machine and configured to control operations of the mobile machine, and a controller in communication with the control module. The controller may be configured to anticipate a non-failure machine performance irregularity, and determine an adjustment to an operation of the mobile machine that positively affects the machine performance irregularity. The controller may also be configured to cause implementation of the adjustment before the machine performance irregularity occurs.

According to another aspect, the present disclosure is directed toward a method of managing a worksite. The method may include collecting data associated with at least one of a machine operation at the worksite and a worksite condition, and analyzing the data to anticipate a non-failure machine performance irregularity. The method may further include determining an adjustment to an operation of a mobile machine at the worksite that positively affects the machine performance irregularity, and implementing the adjustment before the machine performance irregularity occurs.

DETAILED DESCRIPTION

Figure 1:
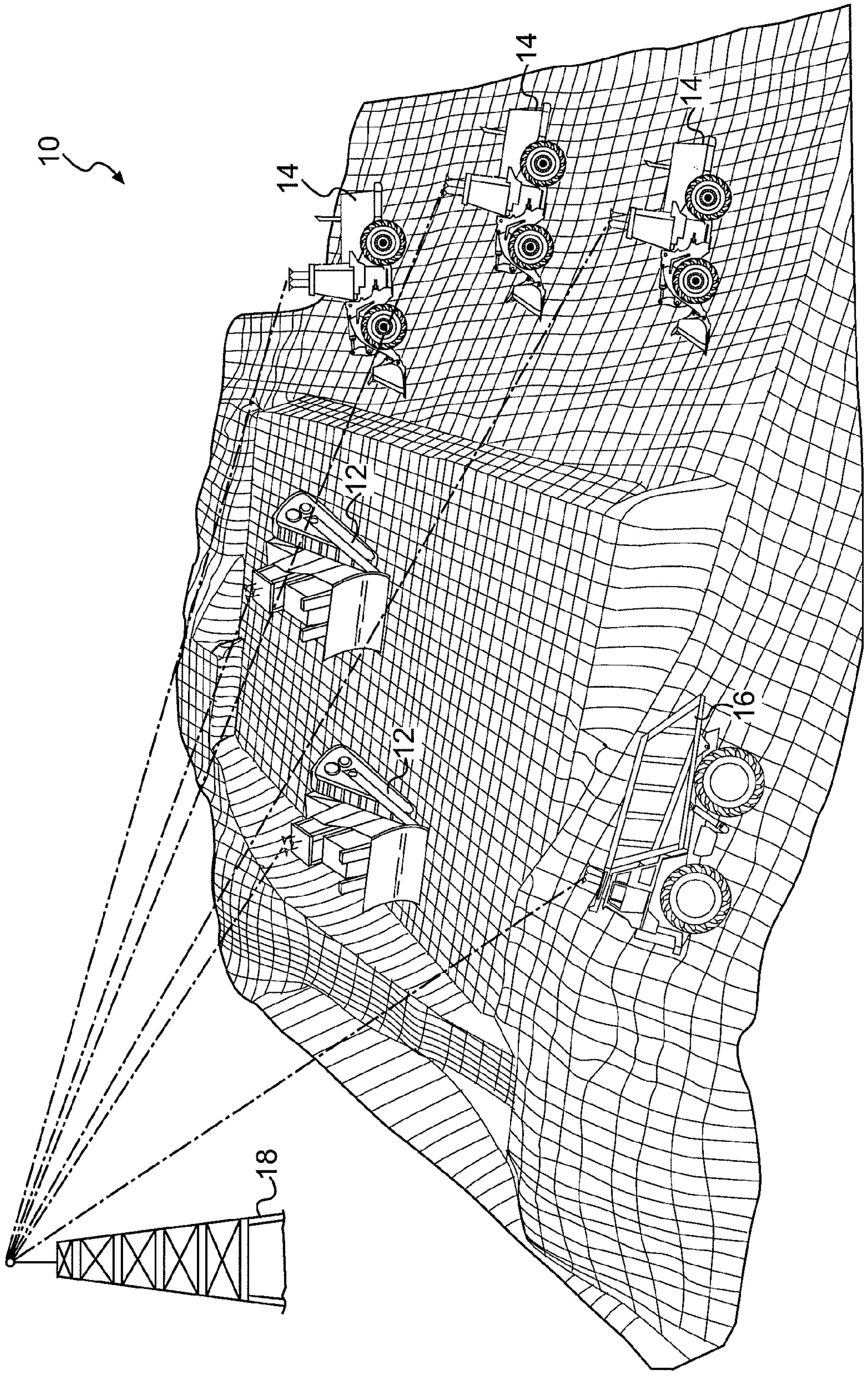
FIG. 1 is a schematic and diagrammatic representation of an exemplary disclosed worksite.

FIG. 1 shows a worksite 10 such as, for example, an open pit mining operation. As part of the mining function, various machines may operate at or between different locations of the worksite 10. These machines may include, digging machines 12, loading machines 14, and hauling machines 16, transport machines (not shown), and other types of machines known in the art. Each of the machines at worksite 10 may be in communication with each other and with a central station 18 by way of wireless communication to remotely transmit and receive operational data and instructions.

A digging machine 12 may refer to any machine that reduces material at worksite 10 for the purpose of subsequent operations (i.e. for blasting, loading, and hauling operations). Examples of digging machines 12 may include excavators, backhoes, dozers, drilling machines, trenchers, drag lines, etc. Multiple digging machines 12 may be co-located within a common area at worksite 10 and may perform similar functions. As such, under normal conditions, similar co-located digging machines 12 should perform about the same with respect to productivity and efficiency when exposed to similar site conditions.

A loading machine 14 may refer to any machine that lifts, carries, and/or loads material that has been reduced by digging machine 12 onto waiting hauling machines 16. Examples of a loading machine 14 may include a wheeled or tracked loader, a front shovel, an excavator, a cable shovel, a stack reclaimer, or any other similar machine. One or more loading machines 14 may operate within common areas of worksite 10 to load reduced materials onto hauling machines 16. Under normal conditions, similar co-located loading machines 14 should perform about the same with respect to productivity and efficiency when exposed to similar site conditions.

A hauling machine 16 may refer to any machine that carries the excavated materials between different locations within worksite 10. Examples of hauling machine 16 may include an articulated truck, an off-highway truck, an on-highway dump truck, a wheel tractor scraper, or any other similar machine.

Laden hauling machines 16 may carry overburden from areas of excavation within worksite 10, along haul roads to various dump sites, and return to the same or different excavation areas to be loaded again. Under normal conditions, similar co-located hauling machines 16 should perform about the same with respect to productivity and efficiency when exposed to similar site conditions.

Figure 2:
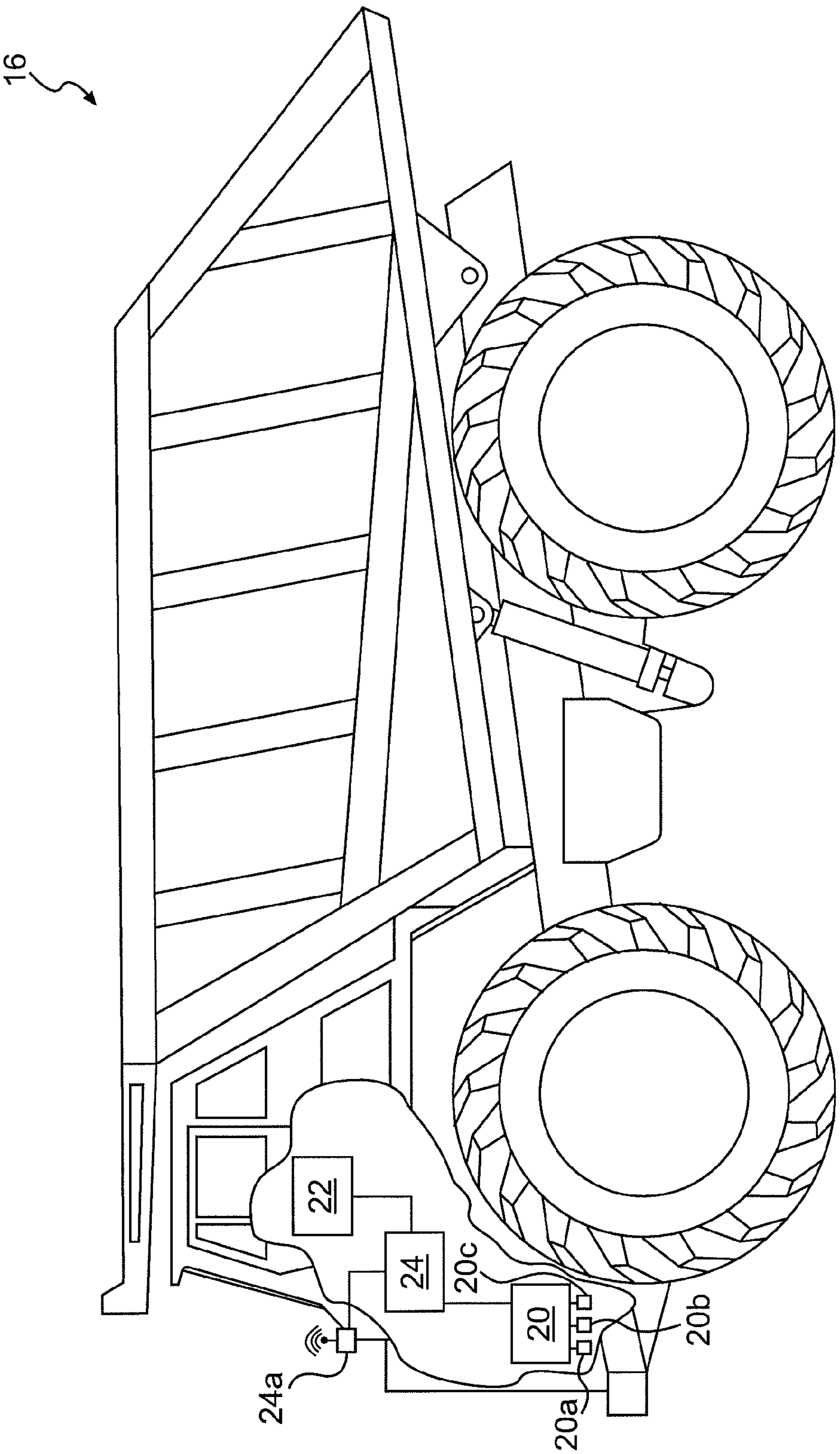
FIG. 2 is a diagrammatic illustration of an exemplary disclosed machine that may operate at the worksite of FIG. 1.

FIG. 2 shows one exemplary machine that may be operated at worksite 10. It should be noted that, although the depicted machine may embody a hauling machine 16, the following description may be equally applied to any machine operating at worksite 10. Hauling machine 16 may record and transmit data to central station 18 (referring to FIG. 1) during its operation. Similarly, central station 18 may analyze the data and transmit information to hauling machines 16. The data transmitted to central station 18 may include machine identification data, performance data, worksite data, diagnostic data, and other data, which may be automatically monitored from onboard machine 16 and/or manually observed and input by machine operators. The information remotely transmitted back to hauling machines 16 may include electronic terrain maps, machine configuration commands, instructions, and/or recommendations.

Identification data may include machine-specific data, operator-specific data, and/or location-specific data. Machine-specific data may include identification data associated with a type of machine (e.g., digging, loading, hauling, etc.), a make and model of machine (e.g., Caterpillar 797 OHT), a machine manufacture date or age, a usage or maintenance/repair history, etc. Operator-specific data may include an identification of a current operator, information about the current operator (e.g., a skill or experience level, an authorization level, an amount of time logged during a current shift , a usage history, etc.), a history of past operators, etc. Site-specific data may include a task currently being performed by the operator, a current location at worksite 10, a location history, a material composition at a particular area of worksite 10, site-imposed speed limits, etc.

Performance data may include current and historic data associated with operation of a machine at worksite 10. Performance data may include, for example, payload information, efficiency information, productivity information, fuel economy information, speed information, traffic information, weather information, road and/or surface condition information, maneuvering information (e.g., braking events, steering, wheel slip, etc.), downtime and repair or maintenance information, etc.

Diagnostic data may include recorded parameter information associated with specific components and/or systems of the machine. For example, diagnostic data could include engine temperatures, engine pressures, engine and/or ground speeds and acceleration, fluid characteristics (e.g., levels, contamination, viscosity, temperature, pressure etc.), fuel consumption, engine emissions, braking conditions, transmission characteristics (e.g., shifting, torques, and speed), air and/or exhaust pressures and temperatures, engine calibrations (e.g., injection and/or ignition timings), wheel torque, rolling resistance, system voltage, etc. Some diagnostic data may be monitored directly, while other data may be derived or calculated from the monitored parameters. Diagnostic data may be used to determine performance data, if desired.

To facilitate the collection, recording, and transmitting of data from the machines at worksite 10 to central station 18 (referring to FIG. 1) and vice versa, each hauling machine 16 may include an onboard control module 20, an operator interface module 22, and a communication module 24. Data received by control and operator interface modules 20, 22 may be sent offboard to central station 18 by way of communication module 24. Communication module 24 may also be used to send instructions and/or recommendations from central station 18 to an operator of hauling machine 16 by way of operator interface module 22. It is contemplated that additional or different modules may be included onboard hauling machine 16, if desired.

Control module 20 may include a plurality of sensors 20*a*, 20*b*, 20*c* distributed throughout hauling machine 16 and configured to gather data from various components and subsystems thereof. It is contemplated that a greater or lesser number of sensors may be included than that shown in FIG. 2. Sensors 20*a-c* may be associated with a power source (not shown), a transmission (not shown), a traction device, a work implement, an operator station, and/or other components and subsystems of hauling machine 16. These sensors may be configured to provide data gathered from each of the associated components and subsystems. Other pieces of information may be generated or maintained by data control module 20 such as, for example, time of day, date, weather, road or surface conditions, and machine location (global and/or local).

Control module 20 may also be in direct communication with the separate components and subsystems of machine 16 to facilitate manual, autonomous, and/or remote control of machine 16. For example, control module 20 may be in communication with the power source of machine 16 to control fueling, the transmission to control shifting, a steering mechanism to control heading, a differential lock to control traction, a braking mechanism to control deceleration, a tool actuator to control material dumping, and with other components and/or subsystems of machine 16. Based on direct commands from a human operator, remote commands from central station 18, and/or self-direction, control module 20 may selectively adjust operation of the components and subsystems of machine 16 to accomplish a predetermined task.

Operator interface module 22 may be located onboard hauling machine 16 for manual recording of data. The data received via interface module 22 may include observed information associated with worksite 10, machine 16, and/or the operator. For example, the observed data may include a defect in the road over which hauling machine 16 is passing, an amount of observed precipitation or visibility at worksite 10, an excessive vibration, sound, or smell of hauling machine 16, or an identity and start time of the operator. The operator may record this information into a physical or electronic log book (not shown) located within hauling machine 16 during or after a work shift. In some cases, data from operator interface module 22 may automatically be combined with data captured by control module 20. For example, operator input regarding a type and criticality of a road defect may be coordinated with a geographical location of hauling machine 16, a vibration measured at the time that the observed data was input, and the name of the operator driving hauling machine 16 at the time the defect was encountered.

Communication module 24 may include any device that facilitates communication of data between hauling machine 16 and central station 18. Communication module 24 may include hardware and/or software that enables sending and/or receiving data through a wireless communication link 24*a*. It is contemplated that, in some situations, the data may be transferred to central station 18 through a direct data link (not shown), or downloaded from hauling machine 16 and uploaded to central station 18, if desired. It is also contemplated that, in some situations, the data automatically monitored by control module 20 may be electronically transmitted, while the operator-observed data may be communicated to central station 18 by a voice communication device, such as a two-way radio (not shown).

Communication module 24 may also have the ability to record the monitored and/or manually input data. For example, communication module 24 may include a data recorder (not shown) having a recording medium (not shown). In some cases, the recording medium may be portable, and data may be transferred from hauling machine 16 to central station 18 using the portable recording medium.

Figure 3:
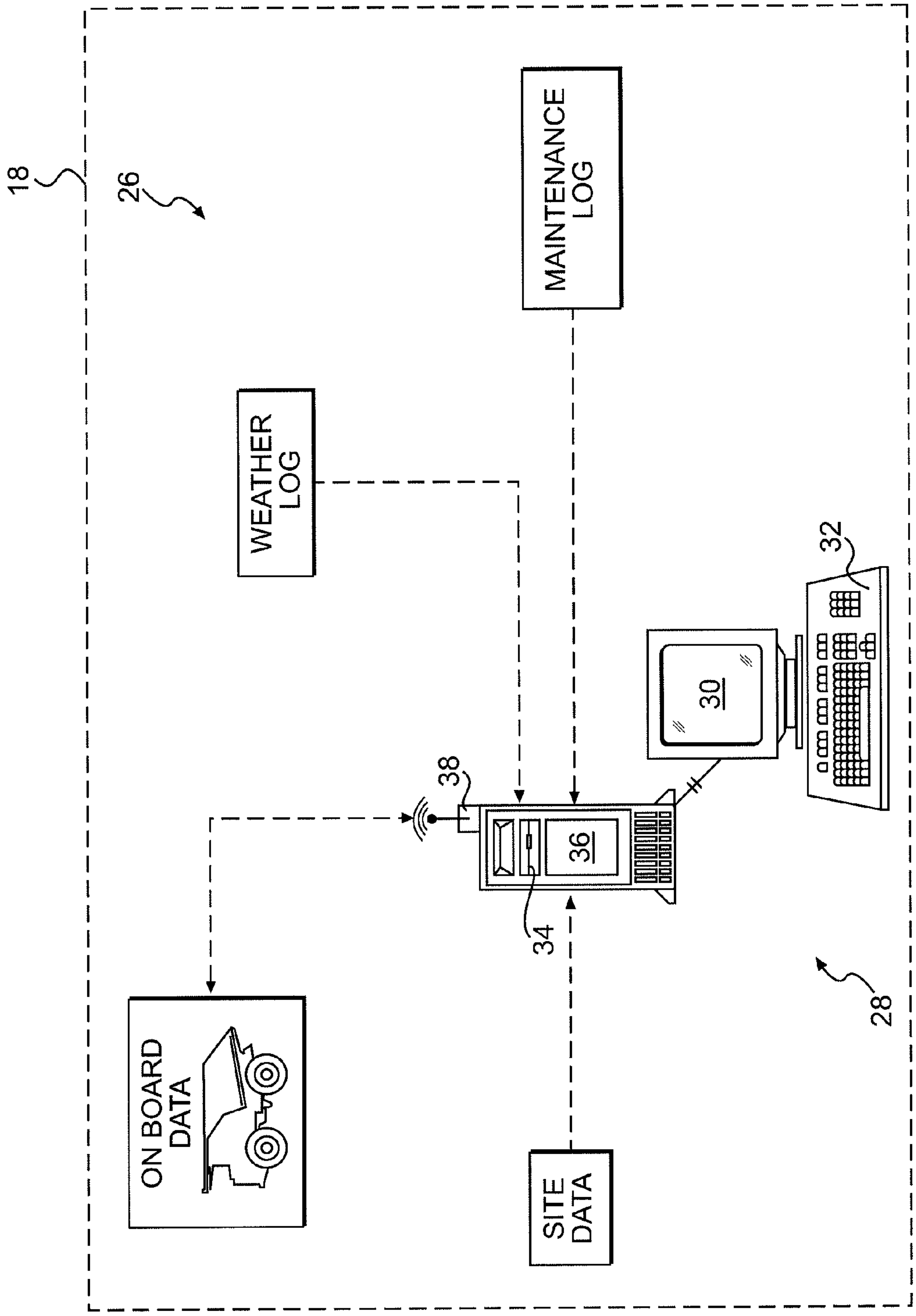
FIG. 3 is a schematic illustration of an exemplary disclosed worksite management system that may be used at the worksite of FIG. 1.

FIG. 3 is a schematic illustration of a worksite management system 26 configured to receive and analyze the data communicated to central station 18 from machines 12-16 and from other sources. Worksite management system 26 may include an offboard controller 28 in remote communication with machines 12-16 via central station 18 and configured to process data from a variety of sources and execute management methods at worksite 10. For the purposes of this disclosure, controller 28 may be primarily focused at positively affecting performance irregularities experienced by the different machines operating at worksite 10. Positively affecting may include reducing a magnitude of the irregularity, reducing a frequency of the irregularity, reducing a severity of the irregularity, or otherwise improving machine operation associated with the irregularity.

Controller 28 may include any type of computer or a plurality of computers networked together. Controller 28 may be located proximate the mining operation of worksite 10 or may be located at a considerable distance remote from the mining operation, such as in a different city or even a different country. It is also contemplated that computers at different locations may be networked together to form controller 28, if desired.

Controller 28 may include among other things, a console 30, an input device 32, an input/output device 34, a storage media 36, and a communication interface 38. Console 30 may be any appropriate type of computer display device that provides a graphics user interface (GUI) to display results and information to operators and other users of worksite management system 26. Input device 32 may be provided for operators to input information into controller 28. Input device 32 may include, for example, a keyboard, a mouse, or another computer input device. The input/output device 34 may be any type of device configured to read/write information from/to a portable recording medium. Input/output device 34 may include among other things, a floppy disk, a CD, a DVD, or a flash memory read/write device. Input/output device 34 may be provided to transfer data into and out of controller 28 using a portable recording medium. Storage media 36 could include any means to store data within controller 28, such as a hard disk. Storage media 36 may be used to store a database containing among others, historical worksite, machine, and operator related data. Communication interface 38 may provide connections with central station 18, enabling controller 28 to be remotely accessed through computer networks, and means for data from remote sources to be transferred into and out of controller 28. Communication interface 38 may contain network connections, data link connections, and/or antennas configured to receive wireless data.

Data may be transferred to controller 28 electronically or manually. Electronic transfer of data includes the remote transfer of data using the wireless capabilities or the data link of communication interface 38. Data may also be electronically transferred into controller 28 through a portable recording medium using input/output device 34. Manually transferring data into controller 28 may include communicating data to a control system operator in some manner, who may then manually input the data into controller 28 by way of, for example, input device 32. The data transferred into controller 28 may include machine identification data, performance data, diagnostic data, and other data. The other data may include for example, weather data (current, historic, and forecast), machine maintenance and repair data, site data such as survey information or soil test information, and other data known in the art.

Controller 28 may generate an analysis of the data collected from the control modules of each machine at worksite 10 and present results of the analysis to a user of worksite management system 26 and/or to the operators of particular machines 12-16 thereof by way of communications interface 38. The results may include a productivity analysis, an economic analysis (e.g., efficiency, fuel economy, operational cost, etc.), an environmental analysis (e.g., exhaust emissions, road conditions, site conditions, etc.), or other analysis specific to each machine, each category of machines (i.e., for digging machines 12, for loading machines 14, or for hauling machines 16), each co-located machine, each operator associated with machines 12-16, and/or for worksite 10 as a whole. In one embodiment, the results may be indexed according to time, for example, according to a particular shift, a particular 24-hr period, or another suitable parameter (e.g., time period, liters of fuel, cost, etc.).

The results of the analysis could be in the form of detailed reports or they could be summarized as a visual representation such as, for example, with an interactive graph. The results may be used to show a historical performance, a current performance, and/or an anticipated performance of machines 12-16 operating at worksite 10. Alternatively or additionally, the results could be used to predict a progression of operations at worksite 10 and to estimate a time before the productivity, efficiency, or other performance measure of a particular machine operator, group of machines, or worksite 10 becomes irregular (i.e., exceeds or falls below a desired or expected limit). In other words, the results of the analysis may indicate when a performance irregularity has occurred, is currently occurring, or anticipated to occur in the future. Controller 28 may flag the user of worksite management system 26 at the time of the irregularity occurrence or during the analysis stage when the irregularity is first detected and/or anticipated.

For the purposes of this disclosure, a performance irregularity can be defined as a non-failure deviation from a historical, expected, or desired machine or worksite performance (e.g., productivity, efficiency, emission, traffic congestion, or similar related performance) that is monitored, calculated, or otherwise received by worksite management system 26. In one embodiment, an amount of deviation required for the irregularity classification may be set by a machine operator, a user of worksite management system 26, a business owner, or other responsible entity. In some situations, the performance irregularity may be indicative of a site condition over which little control may be exercised, but that may still be accommodated to improve operations at worksite 10.

Based on the analysis, when a performance irregularity has been determined to have occurred, be currently occurring, or is anticipated to occur, controller 28 may be adapted to cause remote reconfiguration of an operational relationship of particular machines 12-16 and thereby positively affect the performance irregularity. The operational relationship may include, for example, the shift points included within a transmission map, engine valve and/or ignition timings included within an engine map, fuel settings included within a torque limit map, maximum or minimum speed limits included within a travel limit map, steering boundaries included within a steering map, pressure and/or priority settings included within a tool actuation map, or other similar settings, limits, and/or boundaries contained within other software maps, algorithms, and/or equations stored electronically within the memory of control module 20. In general, reconfiguring the operational relationships described above may affect how a particular machine 12-16 responds in different situations. For example, reconfiguring the shift points of a transmission map may control the engine speed and/or wheel torques at which a transmission of a particular machine 12-16 shifts to a lower or higher gear combination. Similarly, changing engine valve and/or ignition timings of an engine map may control under what conditions intake and/or exhaust valves open or close, at what point within an engine cycle the combustion gas is energized, and resulting engine cylinder pressures and emissions. These changes to the operational relationships of machine 16 may be implemented to improve productivity, efficiency, emissions, or otherwise positively affect the performance irregularity, and may be maintained within the software maps, algorithms, and/or equations until a subsequent reconfiguration is implemented. In other words, reconfiguration of the operational relationship may be semi-permanent and affect subsequent machine performance for an extended period. For the purposes of this disclosure, the term semi-permanent configuration or reconfiguration may be defined as a change to the operational relationship that remains in place for at least a threshold period of time, for example an entire excavation cycle or an entire work shift. Examples of reconfiguration implementation will be provided in the following section.

Controller 28 may cause the remote reconfiguration described above in at least two different ways. In one embodiment, controller 28 may directly reconfigure the operational relationships and/or one or more control parameters stored in the memory of control module 20 via a server-client relationship, thereby affecting future performance of machine 10. In an alternative embodiment, controller 28 may only communicate information regarding the reconfiguration to control module 20 and thereafter allow control module 20 to implement the reconfiguration via a peer-to-peer relationship. It is contemplated that, in some situations the server-client relationship may be utilized, while in other situations the peer-to-peer relationship may be utilized, as desired.

Additionally or alternatively, controller 28 may be adapted to determine a temporary adjustment to machine performance and communicate the adjustment to control module 20 to positively affect the performance irregularity. For example, controller 28 may determine a need for a temporary downshifting of a machine's transmission, a temporary increase in fueling, a temporary locking of a machine's differential, a temporary retarding or braking maneuver, a temporary reduction in travel speed, and/or other temporary adjustments to machine performance that function to improve productivity, efficiency, and emissions, or otherwise positively affect the performance irregularity. Controller 28 may then remotely communicate a command, an instruction, and/or a recommendation to control module 20 regarding the adjustment. Examples of temporarily adjusting machine performance will be provided in the following section.

In some instances, the temporary adjustment and/or semi-permanent reconfiguration described above may be communicated by controller 28 and/or implemented by control module 20 in anticipation of the performance irregularity. That is, in an attempt to avoid occurrence of an anticipated performance irregularity, controller 28 may provide instructions to control module 20 regarding the temporary adjustment and/or reconfigure the appropriate operational relationships just before the anticipated irregularity occurs such that the particular machine 12-16 may begin positively affecting the irregularity at the time when a degradation of the machine performance would normally begin to occur. The temporary adjustment and/or reconfiguration may include operational commands, instructions, and/or recommendations regarding fueling, engine speed, transmission shifting, ground speed, acceleration, deceleration, steering, and other performance parameters. By implementing the temporary adjustment and/or reconfiguration just prior to occurrence of the performance irregularity, a magnitude of the irregularity may be reduced, if not completely eliminated. Following termination of the performance irregularity (or termination of conditions that would have caused the irregularity), the temporary adjustment may be concluded and operation of the particular machine 12-16 returned to normal.

Figure 4:
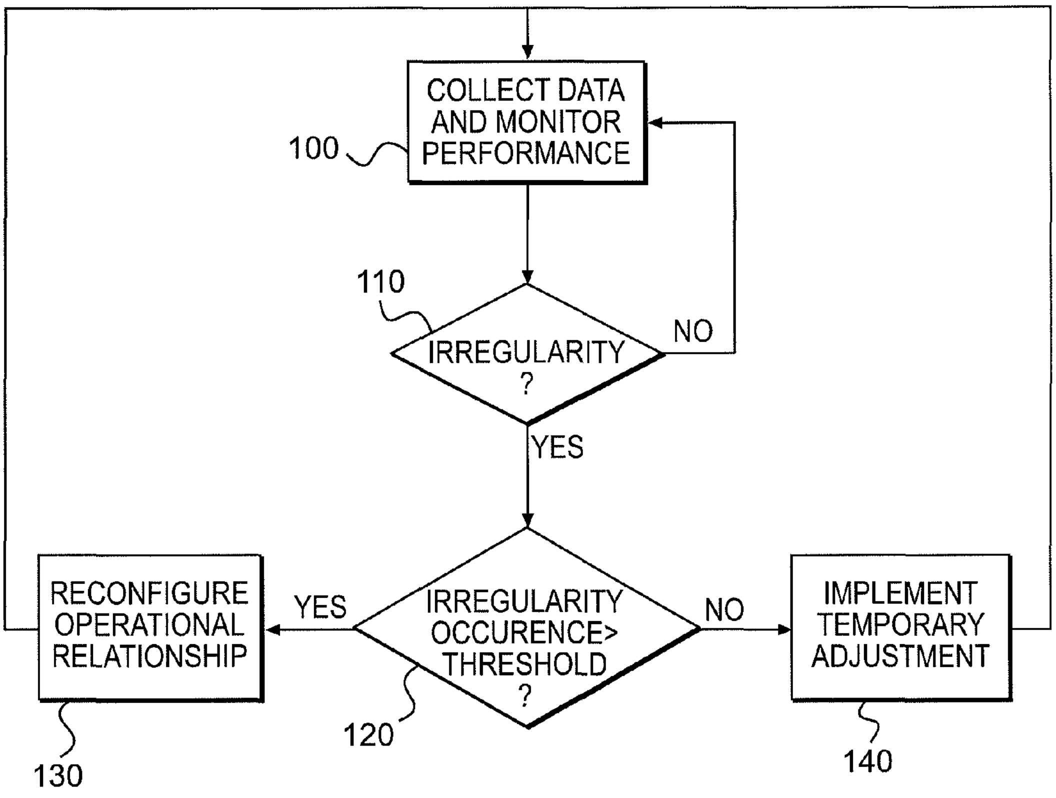
FIG. 4 is a flowchart depicting an exemplary disclosed method that may be performed by the worksite management system of FIG. 3.

FIG. 4 is a flowchart depicting an exemplary operation performed by controller 28. FIG. 4 will be discussed in more detail below to further illustrate worksite management system 26 and its operation.

Industrial Applicability

The disclosed system may provide an efficient method for managing worksite performance. In particular, the disclosed system may manage performance at a worksite by analyzing data measured from onboard machines at the worksite and by selectively reconfiguring particular machines and/or selectively implementing temporary adjustments to the performance of the machines based on the analysis. The reconfiguring and/or temporary adjustments may be implemented based on a historical performance irregularity, an ongoing irregularity, and/or an anticipated irregularity. The operation of worksite management system 26 will now be explained with reference to FIG. 4.

During operation at worksite 10, data from various sources including digging, loading, and hauling machines 12-16, operators thereof, and other sources, may be collected by worksite management system 26 and analyzed against productivity, efficiency, emission regulations, and other performance related goals (Step 100). In one example, controller 28 may analyze or trend the collected data according to general machine identification (e.g., digging machines 12, loading machines 14, or hauling machines 16), according to the identification of each individual machine within a single grouping of machines, according to operator identification, or according to another appropriate factor. Based on the trending, controller 28 may determine the existence of a performance irregularity, the scope of the irregularity, the influence of the irregularity, the severity of the irregularity, and what action should be taken to positively affect the irregularity (Step 110). An irregularity may exist if performance (i.e., productivity, efficiency, emissions, traffic congestion, etc.) of worksite 10, a particular group of machines at worksite 10, a particular machine, or a particular operator is other than expected or desired. If no irregularity exists (Step 110: No), control may return to step 100.

However, when controller 28 determines that a performance irregularity does exist (Step 110: Yes), controller 28 may determine if the performance irregularity is a temporary anomaly or a long-term problem associated with worksite 10 and/or particular machines 12-16 operating at worksite 10. Controller 28 may make this determination by comparing an occurrence history variable associated with the performance irregularity to a threshold value defined by a user of worksite management system 26 (Step 120). The occurrence history variable may be associated with a frequency of the irregularity, a duration of the irregularity, a time period during which the irregularity has occurred, a severity of the irregularity, or any other occurrence history variable known in the art. When controller 28 determines that the occurrence history variable is greater than the threshold value, controller 28 may conclude that the performance irregularity is a long-term irregularity and responsively reconfigure the operational relationship(s) of corresponding machines 12-16 to positively affect the irregularity (Step 130). Otherwise, controller 28 may temporarily adjust operation of particular machines 12-16 to positively affect the irregularity (Step 140). In some situations, controller 28 may both implement long-term reconfiguration of the operational relationship and temporary adjustment to the operations of machines 12-16. Specific examples of the operation of worksite management system 26 are provided below.

In a first example, controller 28 may analyze data from multiple hauling machines 16 of similar make and model operating at a single worksite 10 to determine that the transmissions of these machines 16 have historically been hunting between $3^{rd}$ and $4^{th}$ gears when traversing slopes of a particular grade. Controller 28 may also determine that the transmission hunting occurred as soon as machines 16 arrived on site and resulted in low productivity and early transmission wear, which are performance irregularities that should be permanently corrected. Accordingly, controller 28 may remotely command reconfiguration of the shift maps stored within the control modules 20 of these machines 16 such that shifting from $3^{rd}$ gear to $4^{th}$ gear will occur at a higher engine speed set point. Controller 28 may then maintain the reconfigured shift maps until another performance irregularity calls for additional long term changes.

In a second example, controller 28 may analyze data from some or all machines 16 operating at worksite 10 and/or weather data from another source to anticipate that machines 16 may experience wheel slip when climbing a particular slope of worksite 10 and/or an anti-lock braking system (ABS) event when descending the slope. Wheel slip and ABS events may be performance irregularities that result in increased component wear and reduced efficiency. Controller 28 may determine that these performance irregularities will only be experienced by machines 16 as long as poor weather conditions persist, a relatively a short period of time. Because these performance irregularities may only be temporary, controller 28 may implement only a temporary adjustment to the operation of machines 12-16. The temporary adjustment may include, for example, the locking of machine differentials just prior to ascending the particular slope and/or causing a reduction in travel speed via engine retarding or wheel braking just prior to descending the slope, thereby reducing the likelihood of wheel slip and ABS events on the slope. In one embodiment, the differential locking and/or speed reduction may be automatically triggered based on a monitored location of machines 12-16 before the performance irregularities occur (e.g., before any wheel slip or ABS events are experienced). Because this specific performance irregularity may be only temporary, controller 28 may not implement long term reconfigurations of operational relationships in these situations.

In a final example, controller 28 may analyze data regarding excavation planning of worksite 10. For example, controller 28 may analyze a plan for digging machines 12 to increase a road grade or change a surface contour at a particular location, as well as a progress of digging machines 12 in completing the plan. Based on the planned changes in grade and/or based on a monitored on-going progress of digging machines 12 in the excavation plan, controller 28 may be configured to make temporary adjustments to a differential lock status, a transmission gear selection, and/or an allowable steering range of hauling machines 16 that facilitates productive, efficient, and safe operation of hauling machines 16 on the changing geography. Alternatively or additionally, controller 28 may be configured to implement longer term changes by reconfiguring corresponding software maps, algorithms, and/or equations stored in the memory of particular control modules 20.

It will be apparent to those skilled in the art that various modifications and variations can be made in the disclosed worksite management system without departing from the scope of this disclosure. Other embodiments will be apparent to those skilled in the art from consideration of the specification and practice of the worksite management system. It is intended that the specification and examples be considered as exemplary only, with a true scope being indicated by the following claims.

What is claimed is:

1. A worksite management system for use with a mobile machine, comprising:

a control module located onboard the mobile machine and configured to control operations of the mobile machine; and a controller in communication with the control module and configured to:

anticipate a non-failure machine performance irregularity;

determine an adjustment to an operation of the mobile machine that positively affects the machine performance irregularity by comparing an occurrence history variable to a threshold value;

cause implementation of the adjustment before the machine performance irregularity occurs;

implement a temporary modification of at least one of an engine speed, a transmission shifting, an acceleration, a differential locking, a machine maneuvering, and a timing of machine maneuvering relative to worksite locations, when the occurrence history variable is less than the threshold value; and implement a semi-permanent reconfiguration of an operational relationship stored in a memory of the control module, when the occurrence history variable is greater than the threshold value.

2. The worksite management system of claim 1, wherein the controller is in remote communication with the control modules of multiple mobile machines operating at a common worksite.

3. The worksite management system of claim 2, wherein the performance irregularity is associated with at least one of a productivity, an efficiency, a fuel economy, a speed, and a traffic congestion.

4. The worksite management system of claim 2, wherein the controller is configured to anticipate the machine performance irregularity based on at least one of a weather condition, a payload, a braking event, wheel slip, machine location, and a worksite condition.

5. The worksite management system of claim 4, wherein the controller is configured to anticipate the machine performance irregularity by analyzing historical data collected by the control module from onboard the mobile machine.

6. The worksite management system of claim 4, wherein:

the mobile machine is a first mobile machine; and the controller is configured to anticipate the machine performance irregularity for the first mobile machine by analyzing historical data collected by a control module onboard a second mobile machine located at a common worksite.

7. The worksite management system of claim 6, wherein:

the machine performance irregularity has already occurred in conjunction with operation of the second mobile machine; and the controller is configured to cause implementation of the adjustment onboard the first mobile machine before the machine performance irregularity occurs in conjunction with operation of the first mobile machine, 8. The worksite management system of claim 1, wherein the controller is configured to cause implementation of the adjustment by communicating information regarding the adjustment to the control module and allowing the control module to implement the adjustment.

9. The worksite management system of claim 1, wherein the controller is configured to cause implementation of the adjustment by directly reconfiguring at least one of a control parameter and an operational relationship stored within the memory of the control module.

10. A worksite management system for use with a mobile machine, comprising:

a control module located onboard the mobile machine and configured to control operations of the mobile machine; and a worksite controller in communication with the control module and configured to:

anticipate a machine performance irregularity associated with at least one of a productivity, an efficiency, a fuel economy, a speed, or a traffic congestion based on at least one of a weather condition, a payload, a braking event, wheel slip, machine location, or a worksite condition;

determine an adjustment of the mobile machine that positively affects the machine performance irregularity by comparing an occurrence history variable to a threshold value;

directly implement the adjustment before the machine performance irregularity occurs;

implement a temporary modification of at least one of an engine speed, a transmission shifting, an acceleration, a differential locking, a machine maneuvering, and a timing of machine maneuvering relative to worksite locations, when the occurrence history variable is less than the threshold value; and implement a semi-permanent reconfiguration of an operational relationship stored in a memory of the control module, when the occurrence history variable is greater than the threshold value.

11. A method of managing a worksite, comprising:

collecting data associated with at least one of a machine operation at the worksite and a worksite condition;

analyzing the data to anticipate a non-failure machine performance irregularity;

determining an adjustment to an operation of a mobile machine at the worksite that positively affects the machine performance irregularity by comparing an occurrence history variable to a threshold value;

implementing the adjustment before the machine performance irregularity occurs;

implementing a temporary modification of at least one of an engine speed, a transmission shifting, an acceleration, a differential locking, a machine maneuvering, and a timing of machine maneuvering relative to worksite locations, when the occurrence history variable is less than the threshold value; and implementing a semi-permanent reconfiguration of at least one of a transmission shift map, a torque limit map, and an engine calibration, when the occurrence history variable is greater than the threshold value.

12. The method of claim 11, wherein collecting data includes collecting data from onboard the mobile machine.

13. The method of claim 11, wherein:

the mobile machine is a first mobile machine; and collecting data includes collecting data from onboard a second mobile machine located at a common worksite.

14. The method of claim 13, wherein:

the machine performance irregularity has already occurred in conjunction with operation of the second mobile machine; and the method includes implementing the adjustment onboard the first mobile machine before the machine performance irregularity occurs in conjunction with operation of the first mobile machine.

15. The method of claim 11, wherein the worksite condition includes at least one of a surface contour and a weather condition.

16. The method of claim 11, wherein implementing the adjustment includes communicating information regarding the adjustment to a control module located onboard the mobile machine, and allowing the control module to implement the adjustment.

* * * * *